United States Patent [19]

Dobbins

[11] Patent Number: 5,265,560
[45] Date of Patent: Nov. 30, 1993

[54] WEEKEND PET FEEDER

[76] Inventor: Hugh L. Dobbins, 8050 Lester Rd., Fairburn, Ga. 30213-2943

[21] Appl. No.: 877,991

[22] Filed: May 4, 1992

[51] Int. Cl.$^5$ .............................................. A01K 5/02
[52] U.S. Cl. ............................... 119/51.12; 119/51.11
[58] Field of Search ................. 119/51.12, 51.11, 51.13

[56] References Cited

U.S. PATENT DOCUMENTS

| | | | |
|---|---|---|---|
| 3,330,256 | 7/1967 | De Vaux | 119/51.12 |
| 3,532,075 | 10/1970 | Cooper | 119/51.12 |
| 3,720,186 | 3/1973 | O'Rourke | 119/51.12 |
| 4,164,200 | 8/1979 | Gambling | 119/51.12 |
| 4,185,588 | 1/1980 | Harris | 119/51.12 |
| 4,644,903 | 2/1987 | Shaver | 119/51.12 |

FOREIGN PATENT DOCUMENTS

| | | | |
|---|---|---|---|
| 2256924 | 5/1974 | Fed. Rep. of Germany | 119/51.12 |
| 2183984 | 6/1987 | United Kingdom | 119/51.12 |

*Primary Examiner*—John G. Weiss
*Attorney, Agent, or Firm*—Dobbins Enterprises

[57] ABSTRACT

A pet feeder designed to feed a pet over a period of forty-eight hours, two and a half days, or a weekend you are away. Said device to be made of sheet metal or plastic, made from a plastic injection mold, consisting of four trays that are prepared, placed in each respective compartment, and then closing the lids; whereafter, the first compartment will open twelve hours later, Friday 7:30 PM, the second tray will open 7:30 Saturday morning, and the third tray will open Saturday 7:30 PM, and the fourth tray will open Sunday morning 7:30 AM. Each tray having partitions to allow food, water, or treats to be given to the pet. Pet Feeder for pets requiring only one meal a day can be fed using a two-eight inch tray pet feeder, or by using a two-ten inch tray pet feeder.

1 Claim, 2 Drawing Sheets

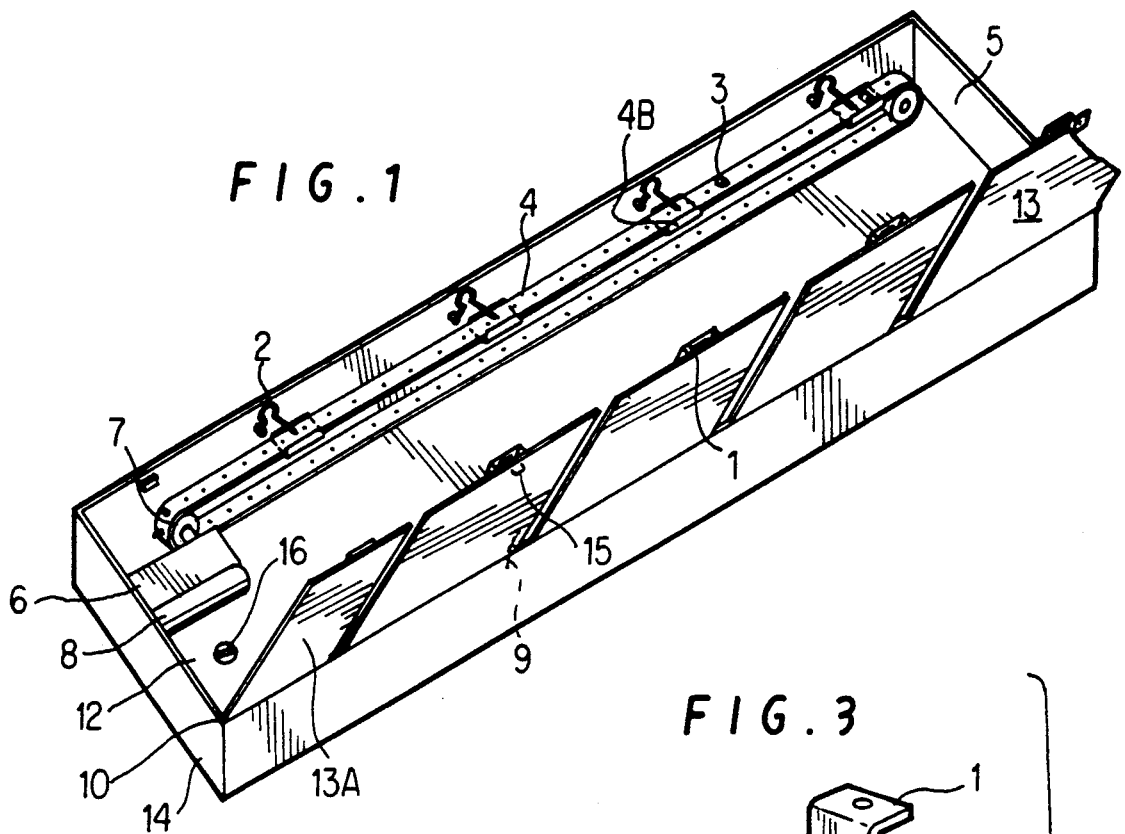
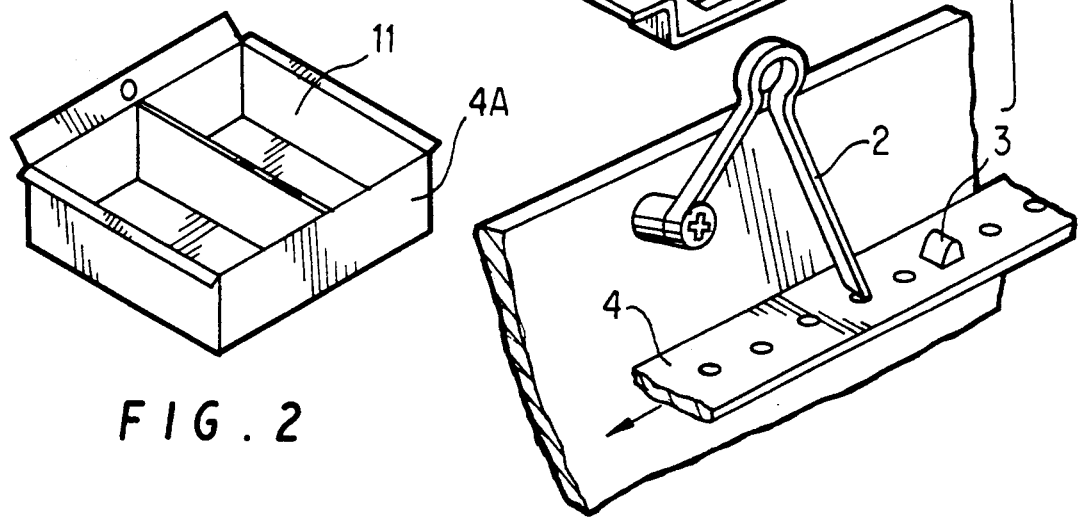
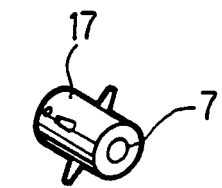
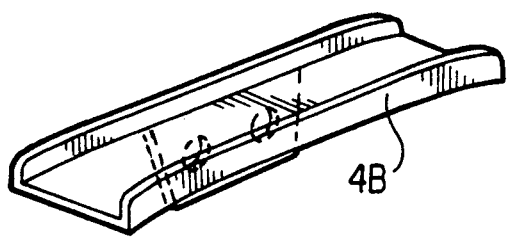

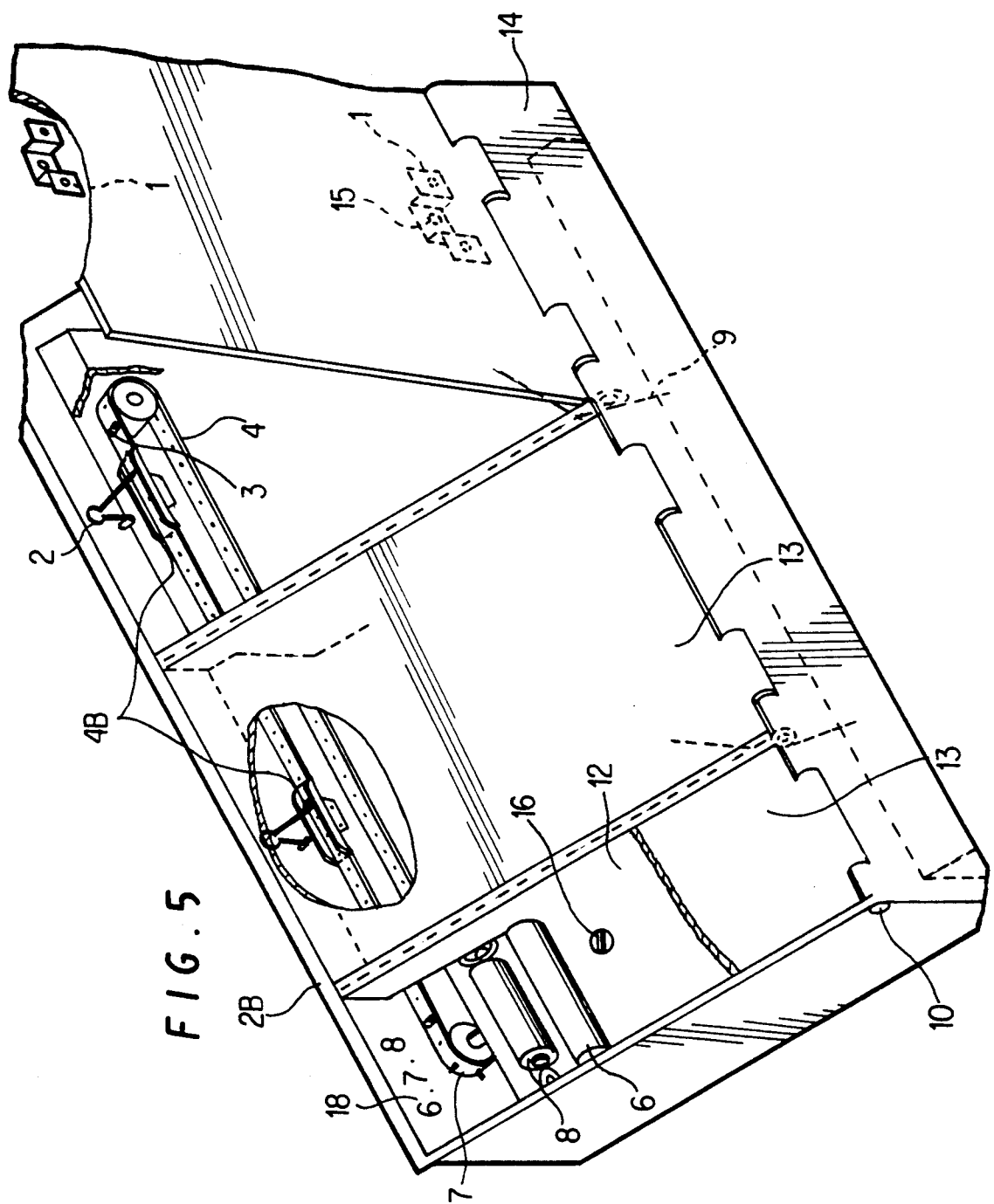

WEEKEND PET FEEDER

FIELD OF THE INVENTION

The present invention relates to the field of pet feeding devices whereby preset means initiate the automatic means of feeding a pet over a period of time. More particularly the present invention relates to means allowing a pet owner to fill four trays with preselected foods, closing each, and allowing a pet to eat, unattended: Friday evening, Saturday morning, Saturday evening, and Sunday morning.

BACKGROUND OF THE INVENTION

It has been the unfortunate province of the pet owner to be required to summon a neighbor to feed the pet, while he is gone for the weekend, or take it to a kennel, or feed the pet using several bowls, or dispensing dry food.

Pet owners with compassion for their pets are more likely to want to provide selected food and treats for their pets. Otherwise, they must rely on leaving the pet dry food stacked in a large bowl, or dry food dispensed at intervals over a period of several days, or leave it at a kennel to be attended and fed for a few days, which costs about as much as the pet feeder would cost. Maintaining a pet close to home is thought to be more appropriate, or to have a neighbor come by periodically to feed it.

The pet is likely to remain more at ease and less likely to become disturbed, staying home and being fed with the Weekend Pet Feeder. Pets often become despondent and unhappy, when the owner goes away, leaving someone else to look after it.

While the prior art has attempted to solve the problem of furnishing meals to their pets in the past, no one has devised a four tray pet feeder that is considered not to be too sophisticated, as is the Weekend Pet Feeder. Attempts in the past to use electro-magnetic plungers, to activate and trigger the lid of four or more trays, is considered too costly and too sophisticated to be used by the consumer. However, the solution posed by the Weekend Pet Feeder, gives it the most logical means to accomplish the fact, and the confidence in a pet feeder, that will not allow the pet to eat until the programmed time for him to eat.

SUMMARY OF THE INVENTION

The present invention discloses an improved version of the prior art related to in the copies referred to in references. The present invention proposes much improved application and the use of at least four trays used to feed a pet over a period of at least forty hours than prior art.

The basic Weekend Pet Feeder is practical, simple to use, and is an unsophisticated, attractive to consumer, device; conceived with the feeling that the pet owner should not leave his pet unattended for more than three days.

The present invention discloses means of providing fresh food for a pet, and not dry, untasty and undesirable food from dispensers or hoppers. The unique triggering device in the present invention provides s pinfeed sprocket on the timing element, and a pinfeed timer belt with notches every four inches, that travels laterally one inch every twelve hours. The power generated from the minute to the hour arm axle, compresses the spring lock trigger as the notch transverses clockwise and compresses the spring lock trigger head smaller, and to the point that the lid will spring open. The notches transverses along each timer belt guide opening each lid respectively every twelve hours.

Trays to be bowl shaped and partitioned, so as to allow for pet food, water and treats in varying quantities. Bowls, or trays, also to be made of a suitable plastic, and to be disposable or washable, enabling them to be removed and discarded or cleaned for reloading again.

Said feeder to be powered by a "C" Battery that causes the Spartus Electric Clock to operate with timing mechanism like that of an alarm clock. A pinfeed sprocket being one inch in diameter is secured to the hour arm axle of said timing device allowing the notches to transverse one inch every twelve hours. Said hour arm axle can be adapted with sprockets of various diameters as: a one inch, a one and a half inch, and a two inch diameter, that will activate four inch wide trays, six inch wide trays and eight inch wide trays.

Weekend Pet Feeder to have timing element mechanism, timing belt with notches, latches, and timing belt guide, situated along the area inside hinges at the backside, to allow for cleaner and safer maintenance, and not interfere with the pet eating.

Other objects, features and characteristics of the present invention, as well as methods of manufacturing and functions of the related elements, will become apparent after considering the following description and the appended claims, all of which form part of this specification.

While the present invention has been described in connection with what are presently considered to be most practical and preferred embodiments, but on the contrary, it is intended to cover various modifications and equivalent detailed description of the preferred embodiment.

Included within the spirit and scope of the appended claims, mechanisms 2, 3, 4, 4B, 5, 6, 7, 8 can be horizontally positioned at the back of the trays.

BRIEF DESCRIPTION OF THE INVENTION

FIG. 1 is a perspective view of a Weekend Pet Feeder according to the present invention.

FIG. 2 is a diagram of a tray to be removable and disposable, and partitioned.

FIG. 3 shows detail of the latch whereby the spring lock trigger enters into the latch and locks lid closed. Also showing direction of the timer belt notch.

FIG. 4 is a perspective of the pinfeed sprocket secured to said timing element belt, with a set screw or epoxy glue.

FIG. 4B shows detail of the timing element belt guide.

FIG. 5 is a perspective view of a two-tray feeder, showing the power compartment, timing element, spring lock trigger, timing element belt with notches and timing element belt guide being positioned at rear.

DETAILED DESCRIPTION OF THE PREFERRED EMBODIMENT

A Weekend Pet Feeder according to the invention is shown in FIGS. 1 and 5 made of sheet metal or suitable plastic, with all compartments open, to display a timing element 6 or alarm clock mechanism, secured with four bolts and nuts, like that of Spartus Electric Clock, and a "C" Battery 8, along with the pinfeed sprocket 7, that pulls the timing element belt 4 with notches 3 passed each of the four trays 11 through the timing element belt guides 4B, compressing the spring lock trigger 2 head until the spring loaded lid 13 opens, thereby allowing the pet to eat, drink, or have a treat. Said timing element 6 has a pinfeed sprocket 7 to give positive traction and is secured to the hour arm axle of the timing element 6.

When preparing to leave for the weekend, each tray 11 is filled in the morning at 7:30 AM with selected pet food, placed in each respective tray 11, and by turning the time setting knob 16 to open the number four tray 11, that you have just placed inside and closed each, then close the number four tray 11 again; tray one 11 will open to allow the pet to eat at 7:30 P.M. FRI. Second tray 11 will open at 7:30 A.M. SAT., Third tray 11 will open 7:30 P.M. Sat., and the fourth tray 11 will open 7:30 A.M. Sunday morning.

Setting the timing element 6 after you have loaded each tray and closed the lids 13, the lid 13A to the timing element 6 compartment 16 is opened, and by turning and positioning timing element belt mark 18 on the respective time to feed pet, mark 1B, shown on the wall of the timing element compartment 16 or on a little marker 18 with the writing "6-7-8" 18 on it that you can line up on the notch 3, or mark on the timing element belt 4 with.

Proper tension of the timing element belt 4 can be adjusted, so that the timing element belt 4 does not sag, is made by loosening adjustment screw 5 and pushing belt away from the timing element 6, then tightening adjustment screw 5.

The diameter of the four tray pet feeder's pinfeed sprocket 7 relates to the width of tray 11 divided by four. One timer notch 3 must be within the tray 11 width. Tray one 11 would be set with the timer element belt notch 3 positioned one inch from activation point for tray one 11 to open, or on a mark showing increments 18 designating times for feeding the pet AM's and PM's.

A pinfeed sprocket 7 being one and a half inches in diameter, will operate four-six inch trays; a pinfeed sprocket 7 being two inches in diameter will transverse four inches every twenty-four hours, thus activating a two-eight inch tray pet feeder, for feeding a pet once a day;

Upon returning, the pet owner is recommended he remove the battery from the battery compartment 8, or to turn off the timing element 6, remove trays 11 to clean or dispose of them. Pet feeder can be secured to the base and held firmly to the surface if necessary.

Hinging the lids 13 can be accomplished by using self-contained springed hinges, using full width rod 10 running through each lid 13 with separate coil expansion spring 9, or any appropriate means to allow the lids 13 to open easily and in a vertical position.

Trays 11 to be partitioned to allow flexibility of giving food, water, or treats, depending on what you want the pet to have.

I claim:
1. An automatic pet feeder comprising;
a base portion having upwardly extending side walls,
a plurality of feed trays positioned within the side walls of the base portion,
a plurality of lids pivotally attached to the base portion with a single lid associated with each respective tray to cover said tray securing food therein, said lid is pivotally attached to the base portion by a spring hinge that biases the lid in an open position to expose the food in the associated tray,
a plurality of spring locks attached to the base portion, each lock used to secure a single said lid in a closed position covering the associated tray,
a moveable timing belt in the base portion positioned below the spring locks,
a triggering notch attached to the timing belt to engage and move the spring locks to an non-locking position as the timing belt moves the notch passed each lock causing the spring locks to release the lids of the corresponding trays to an open position,
a powered timing clock having a sprocket attached by a drive arm of the clock, rotating of the sprocket drives the timing belt in a predetermined time sequence below the spring locks, thereby allowing for a predetermined timed sequence of opening of the lids of the feed trays to permit a pet owner to leave a pet unattended over an extended period of time.

* * * * *